(12) United States Patent
Nellen et al.

(10) Patent No.: US 9,290,087 B2
(45) Date of Patent: Mar. 22, 2016

(54) OPEN ROOF CONSTRUCTION FOR A VEHICLE

(71) Applicant: Inalfa Roof Systems Group B.V., Venray (NL)

(72) Inventors: Marcel Johan Christiaan Nellen, Merselo (NL); Peter Christiaan Leonardus Johannes Manders, Horst (NL); Mark Broeren, Oostrum (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 14/482,380

(22) Filed: Sep. 10, 2014

(65) Prior Publication Data
US 2015/0069796 A1    Mar. 12, 2015

(30) Foreign Application Priority Data
Sep. 12, 2013   (EP) .................................... 13184121

(51) Int. Cl.
| | |
|---|---|
| B60J 7/22 | (2006.01) |
| B60J 7/057 | (2006.01) |
| B60J 10/12 | (2006.01) |
| B60J 7/04 | (2006.01) |

(52) U.S. Cl.
CPC .. B60J 7/057 (2013.01); B60J 7/04 (2013.01); B60J 7/0573 (2013.01); B60J 7/22 (2013.01); B60J 10/12 (2013.01)

(58) Field of Classification Search
CPC ............ B60J 7/22; B60J 7/057; B60J 7/0573; B60J 7/04; B60J 10/12
USPC ......................................................... 296/217
See application file for complete search history.

(56) References Cited

U.S. PATENT DOCUMENTS 7,234,767 B2 * 6/2007 Boss et al. ..................... 296/217
2010/0066130 A1 3/2010 Rashidy et al.

FOREIGN PATENT DOCUMENTS

DE        102009052622 A1     5/2011

OTHER PUBLICATIONS

European Search Report dated Feb. 17, 2014 for corresponding European Application 13184121.5, filed Sep. 12, 2013.

* cited by examiner

*Primary Examiner* — Dennis H Pedder
(74) *Attorney, Agent, or Firm* — Steven M. Koehler; Westman, Champlin & Koehler, P.A.

(57) ABSTRACT

An open roof construction for a vehicle comprises a roof opening in a stationary roof part and a seal extending along the roof opening and a panel movable between a closing and opening position for closing and opening, respectively, said roof opening. The panel comprises a first panel part which both in the closing and opening positions is positioned inside the seal, as seen in a top plan view, as well as a second panel part which both in the closing and opening positions is positioned outside the seal. Front and rear mechanisms cause movement of the panel. At least one mechanism is provided at the first panel part. A movable element is positioned outside the seal and has a drive mechanism. The second panel part is provided with at least one drive member which is operatively coupled to the drive mechanism of the movable element.

20 Claims, 2 Drawing Sheets

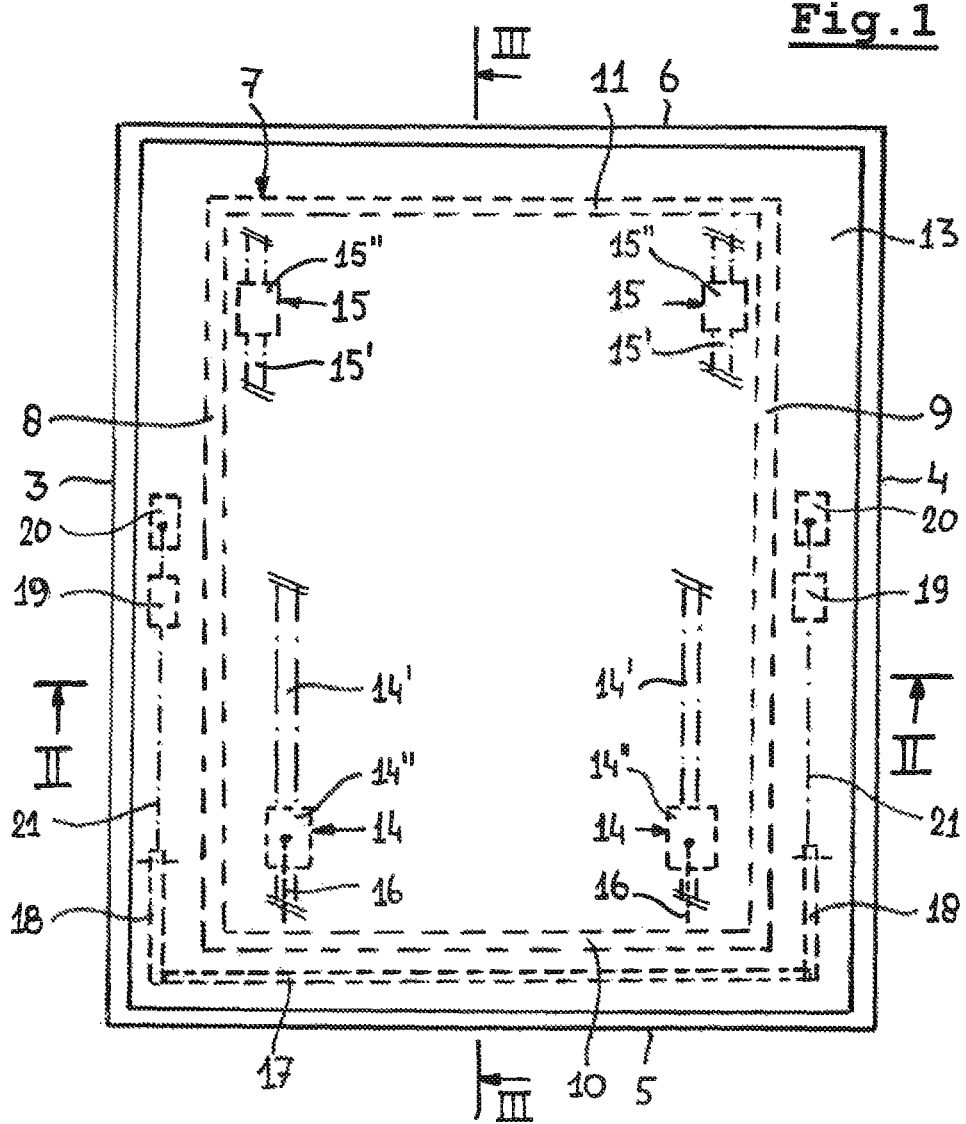
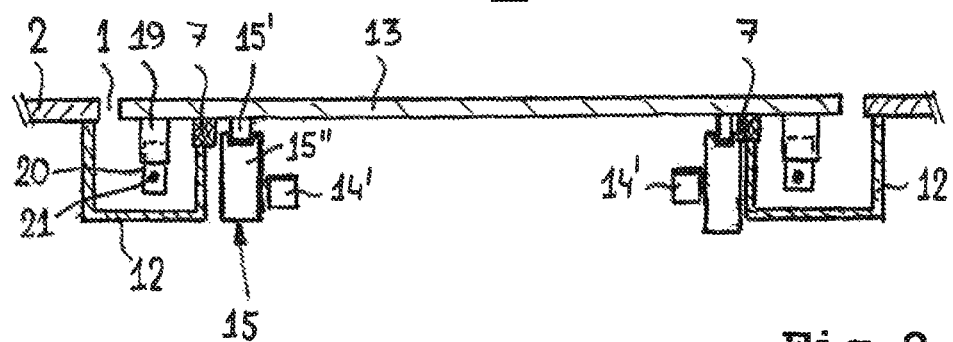

OPEN ROOF CONSTRUCTION FOR A VEHICLE

BACKGROUND

The discussion below is merely provided for general background information and is not intended to be used as an aid in determining the scope of the claimed subject matter.

The invention relates to an open roof construction for a vehicle, comprising a roof opening in a stationary roof part and a seal extending along the roof opening, a panel movable between a closing and opening position for closing and opening, respectively, said roof opening, which panel comprises a first panel part which both in the closing and opening positions is positioned inside the seal, as seen in a top plan view, as well as a second panel part which both in the closing and opening positions is positioned outside the seal, wherein the panel further comprises front and rear mechanisms for causing its movement, of which at least one mechanism is provided at the first panel part, wherein the open roof construction further comprises a movable element positioned outside the seal and having a drive mechanism.

The area inside the seal also is referred to as dry area and is protected by the seal against environmental influences, such as rain water. The area outside of the seal, however, will be subjected to such influences. Generally, the important parts of mechanisms, especially moving parts, will be located in the dry area. Thus, drive mechanisms for such moving parts also can be positioned in said dry area. However, certain parts of an open roof construction must (partly or entirely) be positioned in the wet area. When such parts define a movable element (for example a wind deflector which can move between retracted and extended positions), a problem arises when providing a drive mechanism therefore. Directly positioning the drive source (such as an electric motor) for such a drive mechanism in the wet area is not possible because of the negative effect of the environmental influences on such a drive source. Positioning such a drive source in the dry area would solve that problem, but then the operational coupling between such a drive source and the drive mechanism of said movable element would have to pass the seal. This, however, would lead to a local disruption of the seal or would require rather complicated technical measures assuring a passage of the seal without detrimentally influencing the proper sealing function thereof.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present invention provides an improved open roof construction of the above type where the second panel part is provided with at least one drive member which is operatively coupled to the drive mechanism of the movable element.

In accordance with an aspect of the present invention the panel is used as a means to transfer a driving force from a drive source positioned in the dry area (for example a drive source for the mechanism provided at the first panel part) towards the drive mechanism of the movable element which is located in the wet area. The seal remains unaffected and fully functional.

In one embodiment only one of said front and rear mechanisms is provided at the first panel part, whereas the other of said front and rear mechanisms is provided at the second panel part and defines the at least one drive member.

This means that the mechanism provided at the second panel part (and thus in the wet area) serves two functions: firstly determining (part of) the movement of the panel (together with the other mechanism positioned in the dry area) and, secondly, providing a drive member for transmitting a drive force to the drive mechanism of the movable member.

It is possible, then, that the front mechanism is provided at the first panel part or that the rear mechanism is provided at the first panel part. This will depend on the specific construction and type of the open roof construction (for example whether or not the panel is a top sliding panel).

In another embodiment of the open roof construction according to the present invention both said front and rear mechanisms are provided at the first panel part and the at least one drive member is a separate part.

In such an embodiment, therefore, none of the mechanisms serves two functions as explained above, but both only are provided for moving and guiding the panel. The specific details of such mechanisms may depend on the required movement of the panel, and have no bearing on this invention and thus are not in detail discussed here. It is just noted, that such (front and/or rear) mechanisms may have a rather complicated design with a number of parts moving relative to each other (such as, for example, tilting levers, operating slides and guide pin-and-guide slot assemblies), but also may have a very simple design with very few parts (for example only a slide shoe or alike cooperating with a guide rail). All these mechanisms are meant to be encompassed within the scope of the present invention.

In one embodiment the at least one drive member comprises a tab attached to the second panel part. In such an embodiment the tab is a separate part which is used for activating the drive member.

Such an activation may be realised in many ways. In one possible embodiment the operational coupling between the tab and the drive mechanism of the movable element further comprises a counter tab engageable by the tab and connected to the drive mechanism by a coupling member. Thus a movement of the panel leads to an engagement between the tab and counter tab for driving the latter. In the initial position (panel in the closing position) a gap between the tab and counter tab may be present, such that the panel first should move to bridge said gap before the tab engages the counter tab and the movable member is driven by the counter tab (via the drive mechanism).

The coupling member may be an elongate member, such as a rod, belt, push-and-pull cable or alike. Such elongate members are known per se and have a wide spread use on the field of open roof constructions with proven reliability.

In a specific embodiment of the open roof construction, the movable element is a wind deflector. Such a wind deflector may be of a known design, for example comprising a transverse wind deflecting element carried at its opposite ends by two pivot arms which then form part of the drive mechanism.

In another embodiment at least one of said front and rear mechanisms comprises a sliding and tilting lever movable along a stationary guide and driven by a drive assembly.

In yet another preferred embodiment of the open roof construction the roof opening is substantially rectangular having opposite side edges and opposite forward and rearward edges, wherein the seal likewise extends substantially in a rectangular shape having opposite side seal parts and opposite forward and rearward seal parts, and wherein the drive member is provided at a part of the second panel part located, as seen in a top plan view, between a side edge of the roof opening and a corresponding side seal part. It is noted however that it is also possible that the drive member is provided at a part of the second panel part between a forward (or rearward) seal part and corresponding forward (or rearward) edge of the roof opening (although such an embodiment generally will be less favorable).

When the open roof construction is provided with two drive members at opposite sides of the roof, symmetrical forces may be generated causing a minimal amount of distortion of the constitutive parts, leading to less friction, reduced wear and a smaller power demand for drive sources, such as electric motors.

BRIEF DESCRIPTION OF THE DRAWINGS

Hereinafter aspects of the invention will be elucidated while referring to the drawing, in which:

FIG. 1 schematically illustrates a top plan view of a first embodiment of the open roof construction, with the panel in its closing position;

FIG. 2 schematically shows a cross section according to II-II in FIG. 1;

DETAILED DESCRIPTION OF THE ILLUSTRATIVE EMBODIMENTS

Figure 3:
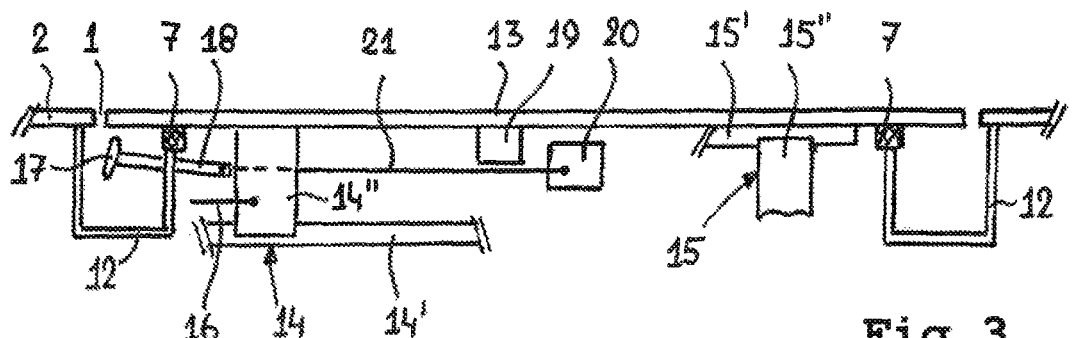
FIG. 3 schematically shows a cross section according to III-III in FIG. 1.

Referring to FIGS. 1-3 a first embodiment of the open roof construction for a vehicle is shown. It comprises a roof opening 1 in a stationary roof part 2 of the vehicle, the stationary roof part 2 herein representing the vehicle (in FIG. 1 the forward direction of the vehicle is directed downwards). In the illustrated exemplary embodiment the roof opening 1 is substantially rectangular having opposite side edges 3,4 and opposite forward and rearward edges 5,6. A seal (generally indicated with 7) extends along the roof opening 1 (thus likewise substantially in a rectangular shape) and has opposite side seal parts 8,9 and opposite forward and rearward seal parts 10,11. It should be noted that aspects of the invention are not limited to rectangular roof openings, panels and/or seals.

The area inside of the seal 7 is sometimes referred to as dry area, whereas the area between the seal parts 8,9,10,11 and corresponding edges of the roof opening 1 (e.g. between side edge 3 and side seal part 8) is referred to as wet area. In said wet area generally a water collecting gutter 12 is provided extending along the roof opening 1 and connecting the seal 7 with the stationary roof part 2.

The open roof construction further comprises a panel 13 movable between a closing and opening position for closing and opening, respectively, said roof opening 1. In the figures the panel 13 only has been illustrated in its closing position. The panel 13 comprises a first panel part (or parts) which both in the closing and opening positions (and any intermediate position) is (are) positioned inside the seal 7, as seen in a top plan view. Such first panel part, for example, will comprise a forward region of the panel 13 inside of the seal 7. Likewise the panel 13 comprises a second panel part (or parts) which both in the closing and opening positions (and any intermediate position) is (are) positioned outside the seal 7. Such second panel part, for example, comprises two side regions of the panel 13 outwardly from the seal 7. The panel 13 as a whole can be formed of material comprising but not limited to metal and/or glass, where one or more of the panel parts are integral being formed of a single unitary body, or comprise different materials typically fixedly connected together. The panel 13 further comprises front and rear mechanisms 14,15 for causing its movement. In the illustrated embodiment at least the front mechanism 14 is provided at said first panel part and comprises a stationary guide 14' and a movable member 14" (for example lever) connecting the panel 13 in a movable manner with the guide 14' (as is known per se). A drive member 16 (for example push-pull cable) is provided for driving the member 14".

In the illustrated embodiment the rear mechanism 15 comprises a guide 15' attached to the panel 13 and a member 15" (for example lever) connecting the panel 13 with the remainder of the vehicle (for example with the stationary roof part 2).

In a manner known per se, the member 14" is driven by drive member 16 for a movement along and with respect to the guide 14' (which movement, for example, may comprise any combination of a rotation and a translation) thus causing a movement of the panel 13. Said movement of the panel 13 further will be defined by the relative movement between member 15" and corresponding guide 15'.

The open roof construction further comprises a movable element 17 (here a wind deflector with two pivot arms 18) positioned outside the seal 7 and having a drive mechanism (comprising said pivot arms 18).

The second panel part at locations, as seen in a top plan view, between a side edge 3,4 of the roof opening 1 and a corresponding side seal part 8,9, is provided with two drive members 19 (here tabs connected to the panel 13) which are operatively coupled to the drive mechanism (pivot arms 18) of the movable element 17. Specifically, such an operational coupling between the drive members (or tabs) 19 and the drive mechanism (or pivot arms) 18 of the movable element (or wind deflector) 17 further comprises two counter tabs 20 engageable by the tabs 19 and connected to the drive mechanisms 18 by coupling members 21 (for example each comprising an elongate member, such as a rod, belt, push-and-pull cable or alike). Said counter tabs 20 are movable in the longitudinal direction of the vehicle (for example along a stationary guide—not illustrated—, but can be similar to guide 14').

When the panel 13 moves from the closed towards an open position (for example to the right in FIG. 3), each tab 19 will engage a corresponding counter tab 20 and will move the counter tab 20 along with tab 19, thus (via the counter tab being operably coupled to the coupling member 21 and pivot arm 18) driving the movable element 17. In the exemplary embodiment, this will cause the wind deflector to move upwardly from its retracted position. The counter tab 20 (or coupling member 21 or any part of the drive mechanism/pivot arm 18) of the movable element may be spring loaded, such that the counter tab 20 will assume a start position when not engaged by the tab 19. There further may be a delay between the start of the movement of the panel 13 and the moment of the tab 19 engaging the counter tab 20 (the magnitude of such a delay, for example, may depend from the gap between the tab 19 and counter tab 20 in the closed position of the panel).

A drive force transmitted to the front mechanism 14 (located in the dry area) through the drive member 16 thus also reaches the movable element 17 (located in the wet area) without the need of providing a connection which has to pass (and interrupt) the seal 7. The panel 13 is used for transferring said drive force from the dry area towards the wet area.

Figure 4:
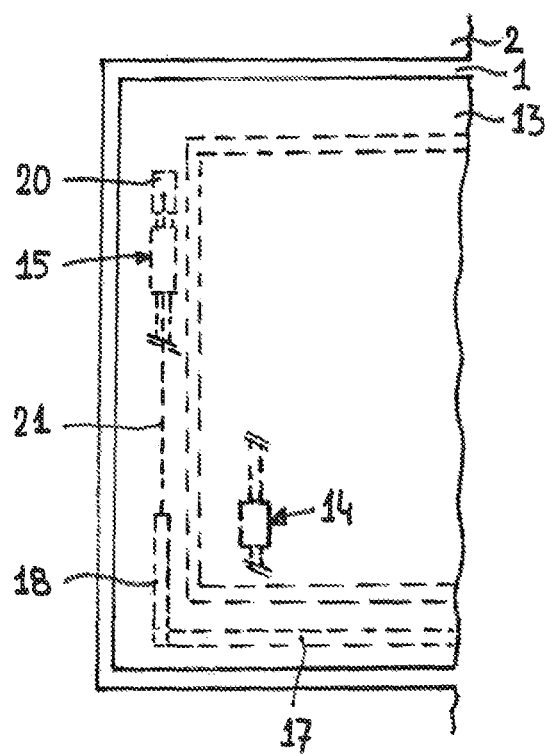
FIG. 4 schematically illustrates a partial top plan view of a second embodiment of the open roof construction, with the panel in its closing position.

Whereas in FIGS. 1-3 both mechanisms 14 and 15 basically are located at the first panel part (thus in the so-called dry area), FIG. 4 partly illustrates an alternative embodiment in which only said front mechanism 14 is provided at the first panel part (inside the seal 7), whereas the rear mechanism 15 is provided at the second panel part (outside the seal 7) and (part thereof) defines the drive member which, again, is connected to the movable member 17 through a counter tab 20 and coupling member 21. In such an embodiment a separate drive member is not present because the rear drive mechanism 15 acts as such. Of course the functions of the front and rear mechanisms may be switched.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle having a roof opening in a stationary roof part, the open roof construction comprising:
   a seal configured to extend along the roof opening;
   a panel movable between a closing and opening position configured to close and open, respectively, said roof opening, which panel comprises a first panel part which both in the closing and opening positions is positioned inside the seal, as well as a second panel part which both in the closing and opening positions is positioned outside the seal, wherein the panel further comprises front and rear mechanisms configured to cause movement of the panel, of which at least one of said front and rear mechanism is provided at the first panel part; and
   a movable element positioned outside the seal and having a drive mechanism, wherein the second panel part is provided with at least one drive member which is operatively coupled to the drive mechanism of the movable element, wherein the at least one drive member comprises a tab attached to the second panel part, and wherein the operational coupling between the tab and the drive mechanism of the movable element further comprises a counter tab engageable by the tab and connected to the drive mechanism by a coupling member.

2. The open roof construction according to claim 1, wherein only one of said front and rear mechanisms is provided at the first panel part, whereas the other of said front and rear mechanisms is provided at the second panel part and defines the at least one drive member.

3. The open roof construction according to claim 1, wherein the front mechanism is provided at the first panel part.

4. The open roof construction according to claim 1, wherein the rear mechanism is provided at the first panel part.

5. The open roof construction according to claim 1, wherein both said front and rear mechanisms are provided at the first panel part and wherein the at least one drive member is a separate part.

6. The open roof construction according to claim 1, wherein the coupling member is an elongate member.

7. The open roof construction according to claim 1, wherein the movable element is a wind deflector.

8. The open roof construction according to claim 1, wherein at least one of said front and rear mechanisms comprises a sliding and tilting lever movable along a stationary guide and driven by a drive assembly.

9. The open roof construction according to claim 1, in which the roof opening is substantially rectangular having opposite side edges and opposite forward and rearward edges, wherein the seal likewise extends substantially in a rectangular shape having opposite side seal parts and opposite forward and rearward seal parts, and wherein the drive member is provided at a part of the second panel part located, as seen in a top plan view, between a side edge of the roof opening and a corresponding side seal part.

10. The open roof construction according to claim 1, provided with two drive members at opposite sides of the roof opening.

11. An open roof construction for a vehicle having a roof opening in a stationary roof part, the open roof construction comprising:
   a seal configured to extend along the roof opening;
   a panel movable between a closing and opening position configured to close and open, respectively, said roof opening, which panel comprises a first panel part which both in the closing and opening positions is positioned inside the seal, as well as a second panel part which both in the closing and opening positions is positioned outside the seal, wherein the panel further comprises front and rear mechanisms configured to cause movement of the panel with respect to the stationary part, of which at least one of said front and rear mechanism is provided under the first panel part, wherein the second panel part includes a drive member attached to the second panel part to move therewith; and
   a movable element positioned outside the seal and coupled to a counter element, positioned outside the seal under the second panel part, with a movable coupling member, the counter element aligned with the drive member to move the counter element with movement of the panel.

12. The open roof construction according to claim 11, wherein only one of said front and rear mechanisms is provided at the first panel part, whereas the other of said front and rear mechanisms is provided at the second panel part and defines the at least one drive member.

13. The open roof construction according to claim 11, wherein the front mechanism is provided at the first panel part.

14. The open roof construction according to claim 11, wherein the rear mechanism is provided at the first panel part.

15. The open roof construction according to claim 11, wherein both said front and rear mechanisms are provided at the first panel part and wherein the at least one drive member is a separate part.

16. The open roof construction according to claim 11, wherein the movable coupling member is an elongate member.

17. The open roof construction according to claim 11, wherein the movable element is a wind deflector.

18. The open roof construction according to claim 11, wherein at least one of said front and rear mechanisms comprises a sliding and tilting lever movable along a stationary guide and driven by a drive assembly.

19. The open roof construction according to claim 11, in which the roof opening is substantially rectangular having opposite side edges and opposite forward and rearward edges, wherein the seal likewise extends substantially in a rectangular shape having opposite side seal parts and opposite forward and rearward seal parts, and wherein the drive member is provided at a part of the second panel part located, as seen in a top plan view, between a side edge of the roof opening and a corresponding side seal part.

20. The open roof construction according to claim 11, provided with two drive members at opposite sides of the roof opening.

\* \* \* \* \*